Jan. 19, 1965   R. C. VICKERY ETAL   3,166,673
MODULATION OF LASERS BY MAGNETOSTRICTION
Filed Aug. 10, 1962   2 Sheets-Sheet 1

INVENTORS.
RONALD C. VICKERY,
JOSEPH V. FISHER.
BY
Thomas H. Murray.
their
ATTORNEY.

Jan. 19, 1965 R. C. VICKERY ETAL 3,166,673
MODULATION OF LASERS BY MAGNETOSTRICTION
Filed Aug. 10, 1962 2 Sheets-Sheet 2

INVENTORS.
RONALD C. VICKERY,
JOSEPH V. FISHER.
BY Thomas H. Murray.
their
ATTORNEY.

United States Patent Office 3,166,673
Patented Jan. 19, 1965

3,166,673
MODULATION OF LASERS BY MAGNETO-
STRICTION
Ronald C. Vickery, Saxonburg, Pa., and Joseph V. Fisher,
Ridge Road, R.D. 1, Valencia, Pa.; said Vickery
assignor to said Fisher
Filed Aug. 10, 1962, Ser. No. 216,279
8 Claims. (Cl. 250—199)

This invention relates to devices for amplifying wave energy by stimulated emission of radiation, and more particularly to devices for modulating an output beam of radiation produced by stimulated emission.

The present invention is particularly concerned with materials for amplifying light energy by stimulated emission of radiation (i.e., "lasers"). Generally speaking, lasers may be defined as devices for amplifying or generating light by utilizing molecules in the excited state of a wave transition. Interaction between these excited molecules and an incident wave energy field produces additional radiation and hence amplification by "stimulated emission." The operation of lasers is dependent upon the fact that in certain materials the electrons surrounding the nucleus of an atom may be in different energy states. These energy states may be thought of as arising from the interaction of the electron spins with internal or external fields. We may, therefore, refer to them as electron "spin states." The energies of the electron spin states may be varied by an external wave energy field; and the energy difference between two given electron spin states is determined by the magnitude of the external field.

The phenomena of laser action can be summarized as related to the "pumping" of electrons, or rather their spin energy levels, to an excited energy state above their normal or "ground" energy level. After the energy levels of the electron spins are raised to an excited state above their normal or ground level, they may revert back to the ground level, whereupon the energy absorbed in the "pumping" process is liberated; and, in the passage of such liberated energy quanta through the material menstruum, an orientation and accretion of such energy occurs until it is emitted as a coherent beam of rather specific wave length. The wave length, or frequency, of this emitted beam is a function of the discrete energy levels of the paramagnetic ion whose electron spins are pumped, and the pumping energy required is also a function of those levels.

For example, part of the electron spins in certain paramagnetic materials may be at a lower energy state $E_1$, while the remainder may be at a higher energy state $E_2$. The material capable of amplifying wave energy by stimulated emission of radiation is in thermal equilibrium, corresponding to a normal or relaxed condition, where there is an excess electron spin population in the lower energy state $E_1$. Electron spins in the energy states $E_1$ and $E_2$ can interact with a radiation field of appropriate frequency and either absorb energy from the radiation field while advancing to a state of greater energy or, under the influence of the radiation field, can give up some of their energy and drop to a state of lower energy. The amount of energy thus transferred, (i.e., $E_2-E_1$) is related to the frequency of the radiation field by the following equation:

$$E_2-E_1=h\nu$$

where $h$ is Planck's constant and $\nu$ is the frequency of the emitted radiation.

In the case of a laser, the material capable of amplifying wave energy by stimulated emission of radiation is placed within a resonator comprising a pair of spaced reflective surfaces separated by a distance equal to an even multiple of the wave length which it is desired to amplify. By pumping light energies into the material, a steady oscillation of a single wave length can be built up between the reflective surfaces; and if one of the reflective surfaces is only partially reflecting, a portion of the amplified energy will pass therethrough as a coherent beam of extremely high intensity.

Such lasers can, of course, be employed for communication and other purposes. The potentialities of communication systems employing coherent radiation beams emitted from optically pumped laser crystals or glasses are, however, restricted by the absence of adequate means for modulating the emitted radiation beam. Several mechanisms have been suggested for attaining this required modulation which involve the application of polarisers, Kerr cells and means for mechanically adjusting Fabrey-Perot reflectors placed at the ends of optically pumped crystals rods. Such mechanisms present, however, inherent difficulties in application, not the least of which lies in the discreteness of the modulating effect and the ancillary equipment necessary for operating those modulating mechanisms.

The present invention resides in the discovery of a principle and system whereby modulation of coherent radiation emitted from an excited solid-state system can be obtained simply and expeditiously. Specifically, the invention resides in the discovery that host materials containing the paramagnetic ions responsible for laser action, can, without detriment to the emissive activity, be made ferromagnetic and hence to exhibit the phenomenon known as magnetostriction. Thus, by application of a varying wave energy field to the material, the distance between the reflective surfaces at the ends of the material can be made to vary because of this magnetostriction. This also effects variations of the resonance frequency of the crystal and, hence, the frequency of the emitted light beam.

In accordance with the invention, we incorporate into a solid-state host material a ferromagnetic or highly paramagnetic material which does not unduly affect the transmittancy of the system nor quench the fluorescence of the emitting ions by magnetic interaction. Opposing ends of the material are reflective, with one of the ends being only partially reflective to permit emitted light to pass therethrough. Such a system is then exposed to a magnetic or helical electrical field, the intensity of which is varied as required to effect modulation. Because of the ferromagnetic nature of the excited solid-state material, a magnetostrictive effect is observed upon application of the magnetic field. Assuming that the magnetic field is applied in the proper direction, this then alters the distance between the reflecting ends of the crystal or rod which form the boundaries of the resonating cavity. Because the length of the resonating cavity is thus changed, then also is the frequency of the emitted radiation. That is, the emitted frequency fluctuates under the influence of the applied fluctuating magnetic field. This fluctuation of the emitted coherent beam is not large, and it should not be large for preferred applications, however it is sufficient to provide a frequency modulation suitable for the conveyance of frequency coded data.

The above and other objects and features of the invention will become apparent from the following detailed description taken in connection with the accompanying drawings which form a part of this specification, and in which.

Figure 3:
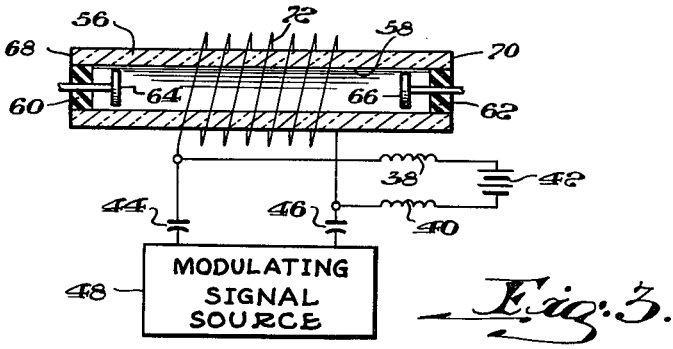
Figure 4:
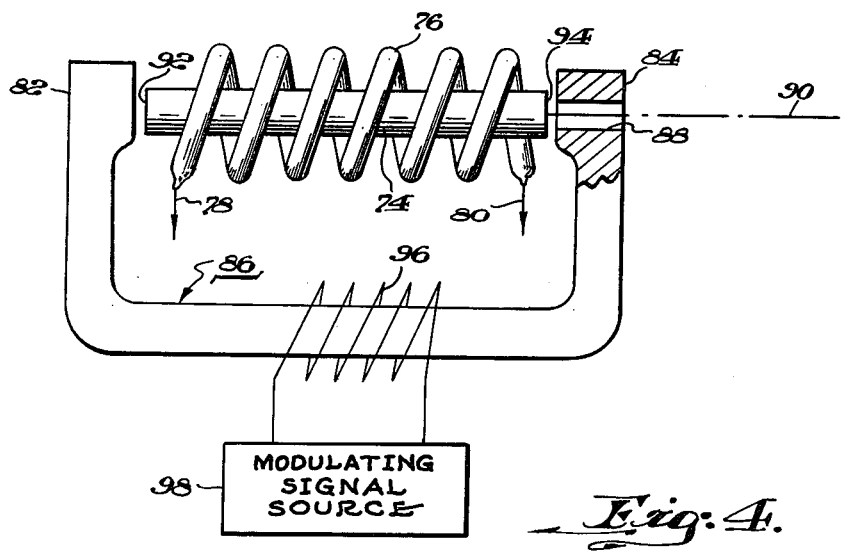

FIG. 3 is a cross-sectional view of a further embodiment of the invention wherein the material having both paramagnetic and ferromagnetic properties forms the envelope for an ultraviolet lamp; and FIG. 4 is an illustration of still another embodiment of the invention in which light is pumped into the material having both paramagnetic and ferromagnetic properties, while a magnetic field is produced by means of a permanent magnet having a coil wound about it whereby the field may be varied by applying an alternating current signal to the coil.

Figure 1:
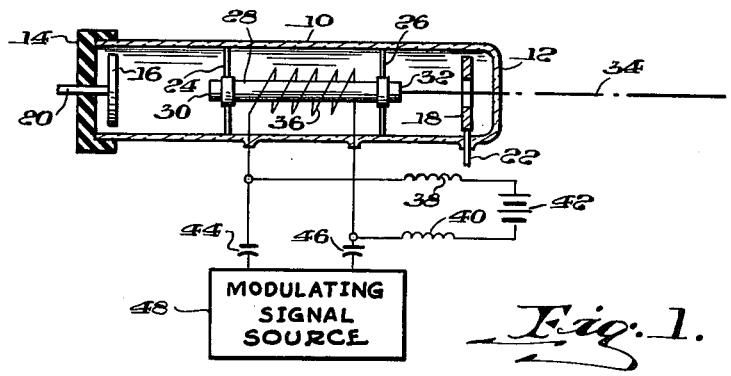
FIGURE 1 is a cross-sectional view of one embodiment of the invention wherein the material having both paramagnetic and ferromagnetic properties is disposed within the envelope of an ultraviolet lamp and wherein magnetostriction is effected by means of an induction coil surrounding the material.

Referring now to the drawings, and particularly to FIG. 1, the embodiment of the invention shown incorporates the principles set forth in our copending application Serial No. 212,924, filed July 27, 1962, wherein paramagnetic material is subjected directly to exciting wave energy which does not pass through any attenuating or absorbing medium. It includes an outer glass or the like envelope 10 having a forward face 12 and an insulating or the like cap 14 fitted over its other end to provide an air-tight enclosure. Positioned within the envelope 10 at the opposite ends thereof are a pair of electrodes 16 and 18, the electrode 18 being annular or toroidal in shape for a purpose which will hereinafter be described. Connected to the electrodes 16 and 18 and projecting through the cap 14 and envelope 10 are leads 20 and 22, respectively, adapted for connection to a source of electrical potential whereby this potential will exist between the electrodes 16 and 18.

The volume within the envelope 10 is filled with a medium of xenon and/or mercury vapors such that ultraviolet radiation will be produced by an electrical discharge between the electrodes 16 and 18. Also positioned within the envelope 10 by means of spacers 24 and 26 is a rod 28 of material having both paramagnetic and ferromagnetic properties. The left end 30 of the rod 28 is silvered so as to be completely reflecting, whereas the right end 32 is silvered so as to be partially reflecting, on the order of about 95% reflective.

The rod 28 may be formed from material of the general type described in our copending application Serial No. 216,073, filed August 10, 1962. Specifically, it may comprise a glass based upon a silicate, phosphate, borate or fluoride matrix in which ferromagnetic and paramagnetic properties are developed by the introduction of concentrations of paramagnetic ions, these ions being selected from the rare earths and transition elements. In order to develop both paramagnetic and ferromagnetic properties in the glasseous substance, about 0.5 to 75% by weight of paramagnetic ions are added thereto, the preferable range being about 20 to 75% by weight. As a specific example, the rod 28 may be formed by melting together one part of gadolinium oxide with two parts of sodium borate and two parts of barium oxide. The resulting glass is transparent and has a ferromagnetic Curie temperature of 279° K. with a saturation magnetization temperature extrapolated to 0° K. of 13.3. As another example, the rod 28 may be produced by melting together eight parts of gadolinium oxide, ten parts of sodium borate, nine parts of barium oxide, and fourteen parts of boron oxide. A material of this type has a Curie temperature of 29.7° K. and a saturation magnetization temperature extrapolated to 0° K. of 45.5. As still another example, the rod 28 may be formed by melting together one part of gadolinium oxide with two parts of boron oxide and one part calcium carbonate. This material has a Curie temperature of 298° K. and a saturation magnetization temperature extrapolated to 0° K. of 60.

It should be noted that the aforesaid glasses are host matrices for the paramagnetic ions responsible for laser action, and that it is possible by suitable choice, to employ the relationship between the paramagnetic (or ferromagnetic) host lattice ions and the "pumped" laser ions to give the multiple doped effect described in our copending application Serial No. 206,192, filed June 29, 1962.

We do not wish to limit the invention to glasseous substances containing paramagnetic ions. As an alternative, the rod 28 may comprise a single crystal comprising a host material doped with a rare earth or transition element, or combination of rare earths and transition elements, the weight of the rare earth or transition element being in the range of 0.5 to 75%. For example, the host material may be calcium fluoride, barium fluoride, cadmium fluoride, manganese oxide, or any of the other host materials described in copending application Serial No. 194,151, filed May 11, 1962. As a specific example, the rod 28 may be calcium fluoride containing terbium, or sodium borate containing terbium, in which case terbium ions can be made to fluoresce in the visible green region (i.e., about 5100 A. to 5800 A.).

In the operation of the device of FIG. 1, an electrical potential is established between the electrodes 16 and 18 by known procedures which can involve the flash discharge of a previously-charged capacitor bank or application of a high intensity direct or alternating current source for continuous illumination. In this process, the xenon and/or mercury vapors within the envelope 10 will ionize to produce ultraviolet wave energy. This wave energy will impinge upon and be "pumped into" the rod 28 to raise the energy levels of the electron spins of the transition or rare earth element ions from energy level $E_1$ to level $E_2$ as described above. When the energy level of the ions falls from $E_2$ to $E_1$, light will be emitted by the rod 28, the reflective ends 30 and 32 forming a resonant cavity effect whereby a steady oscillation will be built up between the opposite ends 30 and 32. Because the right end 32 is only partially reflecting, at least some of the light will pass therethrough along the approximate path 34 and out through the end 12 of the envelope 10.

The frequency of the emitted light from rod 28 depends, of course, upon the spacing between the reflective ends 30 and 32. Consequently, by varying this spacing the frequency of the light emitted from the rod will vary also, thereby producing a modulation effect. Since the rod 28 is ferromagnetic, its length can be made to vary by means of magnetostriction. This is accomplished in the embodiment of FIG. 1 by providing a coil 36 around the rod 28. The opposite ends of the coil 36 are connected through inductive chokes 38 and 40 to a source of direct current potential, such as battery 42. The battery 42 serves to provide a steady-state biasing magnetic field extending along the axis rod 28. Also connected to the coil 36 through capacitors 44 and 46 is a modulating signal source 48. This modulating signal source 48 may comprise an intelligence signal in which the intelligence is indicated by changes in amplitude of the output signal from source 48. This change in amplitude is converted into a change in the strength and direction of the magnetic field produced by coil 36 with the result that the length of the rod 28 is changed by magnetostriction. The resulting change in length of rod 28 varies the length between its reflecting ends 30 and 32 to thereby change the resonant frequency of the rod and, hence, the output frequency.

Figure 2:
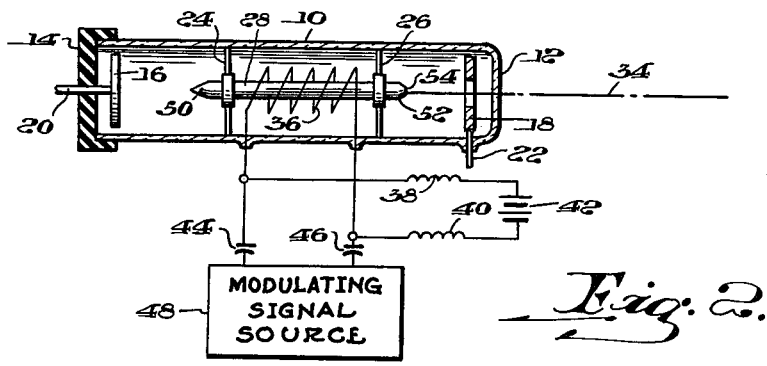
FIG. 2 is a cross-sectional view of another embodiment of the invention which is similar to that of FIG. 1 except that in the case of FIG. 2 the ends of the material having paramagnetic and ferromagnetic properties are cut to reflective angles rather than being silvered as in the embodiment of FIG. 1.

The embodiment shown in FIG. 2 is similar to that of FIG. 1; and, accordingly, elements in FIG. 2 which correspond to those shown in FIG. 1 are identified by like reference numerals. In this case, however, the ends of the rod 28 are not silvered but are rather cut to reflecting angles as at 50 and 52. The end 50 is cut so as to be totally reflecting; whereas the end 52 is provided with a flat space 54 to permit a portion of the light to pass therethrough and out through end 12 of the envelope 10.

In FIG. 3 another embodiment of the invention is shown wherein the envelope 56 comprises a cylinder of material having both paramagnetic and ferromagnetic properties, the material being the same as that described above with respect to rod 28. The cylinder 56 is provided with an axially-extending cavity 58, substantially as shown. The opposing ends of cavity 58 are sealed by means of insulating seals 60 and 62; and electrodes 64 and 66 extend through the seals and are adapted for connection to a source of electrical potential. The cavity 58 is filled with xenon and/or mercury vapors to produce the desired ultraviolet radiation upon the establishment of an electrical potential between the electrodes 64 and 66. The annular ends 68 and 70 of cylinder 56 are silvered, the end 70, for example, being only partially reflecting to permit emitted light to pass therethrough.

The principle of operation of the embodiment of FIG. 3 is the same as those embodiments already described. That is, the ultraviolet radiation passes directly into the paramagnetic and ferromagnetic cylinder 56 without passing through any medium which absorbs or attenuates it. Surrounding the cylinder 56 is an induction coil 72 which is biased by means of battery 42, corresponding to the battery 42 as shown in FIGS. 1 and 2. The modulating signal source 48 is supplied to the coil 72 as in the embodiment of FIG. 1 to thereby vary the length of the cylinder 56 and, hence, the output frequency of light emitted from the cylinder.

In FIG. 4 still another embodiment of the invention is shown wherein the rod 74 which has both paramagnetic and ferromagnetic properties is not disposed within the envelope of an ultraviolet or the like lamp, nor does it form the envelope for such a lamp. Rather, a helical flash tube 76 surrounds the rod 74 and is provided with leads 78 and 80 adapted for connection to a source of electrical potential. The rod 74 is disposed between the opposite poles 82 and 84 of a permanent magnet 86, this magnet serving the same purpose as the biasing battery source 42 in the embodiments of FIGS. 1-3. The pole 84 has an opening at 88 provided therein to permit light to pass therethrough along the approximate path 90. In this respect, the end 92 of the rod 74 is silvered so as to be totally reflecting; whereas the end 94 is silvered so as to be partially reflecting. It should be understood, however, that the ends can be cut to reflecting angles as in the embodiment of FIG. 2 rather than silvered.

Surrounding the core of the permanent magnet 86 is a coil 96 connected to a modulating signal source 98. The operation of the device of FIG. 4 is essentially the same as that of FIGS. 1-3 with the modulating voltage applied to the coil 96 serving to vary the magnetic field applied axially to the rod 74 and, hence, the distance between the reflecting ends 92 and 94 by magnetostriction. This process, of course, varies the output frequency from the rod 74 in the same manner as it is varied in the embodiments of FIGS. 1-3.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. Apparatus for effecting a modulated output beam of radiation produced by stimulated emission of radiation comprising solid-state material having both paramagnetic and ferromagnetic properties, opposing ends of the solid-state material being reflective with one end being totally reflective and the other being partially reflective, the reflective ends of the material forming a resonant cavity effect for wave energy amplified in the material by stimulated emission of radiation, means for pumping wave energy into the material, and means for subjecting said material to a varying wave energy field to thereby change the spacing between said opposing ends.

2. Apparatus for effecting a modulated output beam of radiation produced by stimulated emission of radiation comprising solid-state material having both paramagnetic and ferromagnetic properties, opposing ends of the solid-state material being reflective with one end being totally reflective and the other being partially reflective, the reflective ends of the material forming a resonant cavity effect for wave energy amplified in the material by stimulated emission of radiation, means for pumping wave energy into the material, and means for subjecting said material to a varying magnetic field to thereby change the spacing between said opposing ends by magnetostriction.

3. Apparatus for effecting a modulated output beam of radiation produced by stimulated emission of radiation comprising solid-state material having both paramagnetic and ferromagnetic properties, opposing ends of the solid-state material being reflective with one end being totally reflective and the other being partially reflective, the reflective ends of the material forming a resonant cavity effect for wave energy amplified in the material by stimulated emission of radiation, means for pumping light energy into said solid-state material, and means for subjecting said material to a varying magnetic field extending along a path defined by a substantially straight line between said opposite ends to thereby change the spacing between said opposing ends by magnetostriction.

4. Apparatus for effecting a modulated output beam of radiation by the process of stimulated emission of radiation comprising solid-state material in the form of an elongated rod having both paramagnetic and ferromagnetic properties, the opposing ends of the rod being reflective with one end being totally reflective and the other being partially reflective, the reflective ends of the material forming a resonant cavity effect for wave energy amplified in the material by stimulated emission of radiation, means for pumping wave energy into the solid-state material, an induction coil surrounding said rod and having an axis coincident with the axis of the rod, and means for applying a varying electrical signal to said induction coil to thereby induce a varying magnetic field which changes the spacing between said opposing ends of the rod by magnetostriction.

5. Apparatus for effecting a modulated output beam of radiation by the process of stimulated emission of radiation comprising solid-state material having both paramagnetic and ferromagnetic properties, opposing ends of the solid-state material being reflective with one end being totally reflective and the other being partially reflective, the reflective ends of the material forming a resonant cavity effect for wave energy amplified in the material by stimulated emission of radiation, means for subjecting said paramagnetic material directly to exciting wave energy to raise the energy levels of electron spins of ions therein, the means for subjecting the paramagnetic material to exciting wave energy being characterized in that the wave energy does not pass through any attenuating or absorbing medium before it reaches the paramagnetic material, and means for subjecting said material to a varying magnetic field to thereby change the spacing between said opposing ends by magnetostriction.

6. Apparatus for effecting a modulated output beam of radiation by stimulated emission of radiation comprising a glasseous material doped with about 0.5 to 75% by weight of paramagnetic ions whereby the material has both paramagnetic and ferromagnetic properties, opposing ends of the glasseous material being reflective with one end being totally reflective and the other being partially reflective, the reflective ends of the material forming a resonant cavity effect for wave energy amplified in the material by stimulated emission of radiation, means for pumping wave energy into the material, and means for subjecting said material to a varying magnetic field to thereby change the spacing between said opposing ends by magnetostriction.

7. Apparatus for effecting a modulated output beam of radiation by the process of stimulated emission of radiation comprising a solid-state host material doped with about 0.5 to 75% by weight of paramagnetic ions, opposing ends of the solid-state material being reflective with one end being totally reflective and the other being partially reflective, the reflective ends of the material forming a resonant cavity effect for wave energy amplified in the material by stimulated emission of radiation, means for pumping wave energy into the material, and means for subjecting said material to a varying magnetic field to thereby change the spacing between said opposing ends by magnetostriction.

8. Apparatus for effecting a modulated output beam of radiation by the process of stimulated emission of radiation comprising a solid-state host material doped with about 20 to 75% by weight of paramagnetic ions such that the material will have both ferromagnetic and paramagnetic properties, opposing ends of the solid-state host material being reflective with one end being totally reflective and the other being partially reflective, the reflective ends of the material forming a resonant cavity effect for wave energy amplified in the material by stimulated emission of radiation, means for pumping wave energy into the material, and means for subjecting said material to a varying magnetic field to thereby change the spacing between said opposing ends by magnetostriction.

References Cited by the Examiner

UNITED STATES PATENTS

| | | | |
|---|---|---|---|
| 2,929,922 | 3/60 | Schawlow et al. | 325—26 |
| 2,956,238 | 10/60 | Reder | 331—3 |

OTHER REFERENCES

"On The Modulation of Optical Masers," Proc. I.R.E., vol. 50, No. 7, July 1962, pp. 1686, 1687.

DAVID G. REDINBAUGH, *Primary Examiner*.